United States Patent [19]
Born

[11] 3,988,700
[45] Oct. 26, 1976

[54] GAS-DYNAMIC MOLECULAR LASER

[75] Inventor: Gunthard Born, Munich, Germany

[73] Assignee: Messerschmitt-Bolkow-Blohm GmbH, Munich, Germany

[22] Filed: July 14, 1975

[21] Appl. No.: 595,862

Related U.S. Application Data

[63] Continuation of Ser. No. 363,522, May 24, 1973, abandoned.

[30] Foreign Application Priority Data

May 31, 1972   Germany............................ 2226392

[52] U.S. Cl. ...................... 331/94.5 P; 331/94.5 G; 330/4.3
[51] Int. Cl.²...................... H01S 3/22; H01S 3/095
[58] Field of Search...................... 331/94.5; 330/4.3; 60/265, 271; 239/265.11, 557

[56] References Cited
UNITED STATES PATENTS

3,720,885   3/1973   Koloc............................... 331/94.5

OTHER PUBLICATIONS

Yatsin et al., IEEE J. of Quantum Electronics, Vol. QE8, No. 2, Feb. 1972, pp. 161–163.

*Primary Examiner*—Robert J. Webster
*Attorney, Agent, or Firm*—Woodhams, Blanchard and Flynn

[57] ABSTRACT

In a laser system activated by a molecular gas there is provided a novel nozzle construction for the purpose of effecting expansion of the gas in a minimum period of time but without destroying laminar flow conditions therein. Instead of the relatively long single nozzle of the prior art there is provided a plurality of nozzles expanding in three dimensional directions and arranged in parallel aligned relationship in a cluster closely adjacent each other. The nozzles may be of many cross-sectional shapes but in one embodiment the walls are concave, such that a relatively large wall angle with respect to the direction of flow at the throat of the nozzle diminishes progressively toward the end of the nozzle so that at such end the nozzle walls will be substantially parallel with each other, whereby to discharge the gas stream therefrom in a jet of constant cross-sectional area.

8 Claims, 4 Drawing Figures

GAS-DYNAMIC MOLECULAR LASER

This is a continuation of application Ser. No. 363,522, filed May 24, 1973, now abandoned.

FIELD OF THE INVENTION

The invention relates to a gas-dynamic optical transmitter or amplifier, and more particularly it relates to a so called molecular laser wherein the working medium is a molecular gas, preferably $CO_2$ or CO with the admixture of other gases, such as $N_2$, $H_2O$, He, Ar, etc.

BACKGROUND OF THE INVENTION

The hot $CO_2$ determines the thermal residence of the energy level, wherein in addition to the oscillatory energy of the nuclei which oscillate with respect to one another there is added to the molecule the rotational energy of the rotating molecule. A quick cooling of the working medium causes a partial "freezing" of the upper laser level. Through molecular impacts there occurs a deactivation of the lower level through which occurs the residence inversion required for the laser action.

Known arrangements of gas-dynamic optical transmitters of the above type utilize a parallel connection of a number of two-dimensional Laval nozzles, wherein the dimensions of the nozzle throat are approximately 0.8 to 1.0 mm., the nozzle length is approximately 4 cm. and the nozzle width approximately 1 cm. The hot working medium, for example $CO_2$, flows at supersonic speed through the nozzle in a z-direction and expands therein in an x-direction. In the case of the $CO_2$-laser there is required an expansion ratio between the transverse dimension of the nozzle throat and that of the nozzle outlet of approximately 10 to 20. In the CO-gas-dynamic laser the required expansion ratio is around 100 so that the nozzles in such devices are correspondingly longer. The above-mentioned nozzle lengths are required by the characteristics of gas flow to assure against separation of the gas stream. However, this construction has the disadvantage that the time of transit therethrough is too long so that only a relatively slow cooling occurs and therefore the upper laser level does not freeze completely because it partially follows the cooling. This leads to a lesser residence at the upper laser level and thereby results in a smaller power development. Particularly during a pressure increase this is noticeable because the deactivation by molecular impacts occurs still more rapidly. Thus, it is not possible to utilize high gas densities in the building of gas-dynamic lasers with a high output.

The purpose of the invention is to overcome these disadvantages and to produce an arrangement which permits a complete "freezing" of the upper laser level.

This purpose is attained by arranging a plurality of three-dimensional expanding nozzles in parallel connected relationship above one another and/or side-by-side. In this manner, the nozzle length can be very substantially shortened while maintaining the same nozzle throat diameter, the same expansion ratio and approximately the same inclination of the wall surfaces with respect to the flow direction z. This provides for a more rapid expansion and thereby provides for a very rapid cooling and a consequent complete freezing of the upper laser level because in the shorter time period correspondingly less molecules are deactivated by impacts. From this results the possibility of an increase of the gas density and thus a further increase of the power output.

In various exemplary embodiments it is provided that the individual nozzles be constructed rectangularly or hexagonally similar to a honeycomb. Also an embodiment is provided in which the nozzle throat is constructed circularly and ends in a rectangular or a hexagonal funnel.

Furthermore it is provided that the nozzle wall surfaces are curved concavely so that they convert the gas flow, after an initial strong inclination or expansion at the nozzle throat, into a parallel flow at the end of the nozzle. To accomplish this, there is provided an almost parallel alignment of the nozzle walls during the joining thereof at their nozzle ends. Further it is provided that the nozzle surfaces are polished smooth to avoid flow losses due to laminar or tubulent boundary layers at the edges. Still further means are preferably provided for cooling the nozzles particularly near the throat by a cooling fluid. To improve the cooling function the parts can be made from a metal having good heat-conducting characteristics (for example copper).

If very small nozzles are to be constructed, then it is suggested that the nozzle throat and the nozzle funnel be constructed circularly.

BRIEF DESCRIPTION OF THE DRAWING

The invention will be described and illustrated hereinafter in connection with exemplary embodiments.

In the drawing.

DETAILED DESCRIPTION

Figure 1:
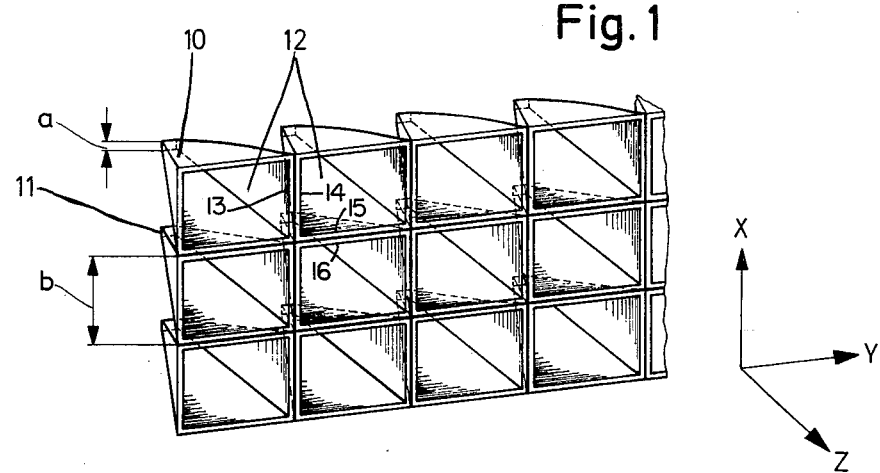
FIG. 1 is a perspective view of a nozzle arrangement with a rectangular cross section.

FIG. 1 shows an arrangement of parallel connected three-dimensionally expanding nozzles 10, the throats 11 of which all have the same transverse dimensions $a$ and the nozzle outlets 12 of which all have the same transverse dimension $b$. The medium flows in z-direction and the expansion is simultaneously in x- and y-direction. At an equal throat diameter $a$ compared with the one $a'$ in an arrangement designed according to previously known practice:

$$a' = a$$

and equal expansion relationship E $$E = b^2 : a^2 \approx 10 \text{ to } 20 \text{ for } CO_2\text{-laser}$$
$$\approx 100 \text{ to } 1000 \text{ for CO-laser.}$$

and at approximately equal central inclination of the wall surfaces to the flow direction z substantially shorter nozzle lengths are obtained.

Figure 2:
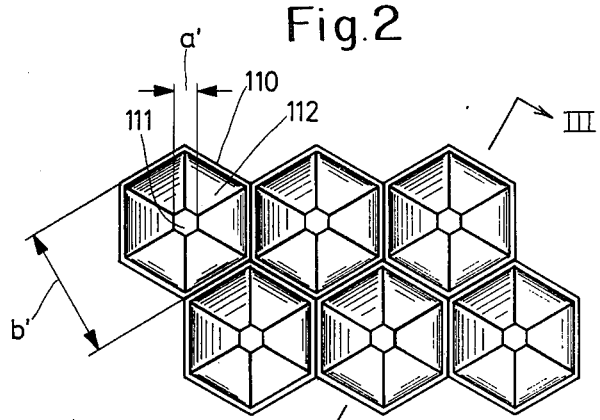
FIG. 2 is a view of a nozzle arrangement with a hexagon cross section.
Figure 3:
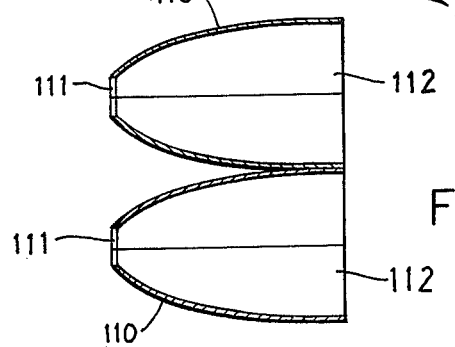
FIG. 3 is a sectional view taken on the line III—III of FIG. 2.
Figure 4:
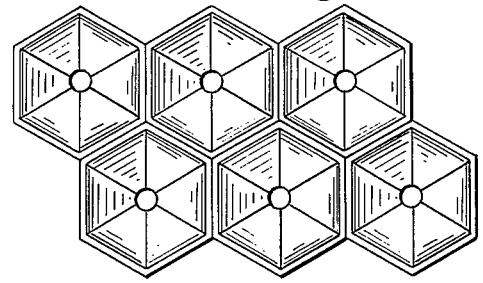
FIG. 4 is a view of a modified nozzle arrangement.

The exemplary embodiment illustrated in FIG. 2 shows an arrangement in which hexagonal nozzles 110 are joined together. The cross-sectional areas of the nozzle throats 111 and those of the outlets 112 have such a ratio to one another that again the expansion relationship $E \approx 10$ to 20 or $E \approx 100$ to 1000 is maintained.

In FIG. 1, as in FIG. 2, the nozzle surfaces are concavely curved. The inclination of the nozzle surfaces toward the flow direction z is the greatest at the throat and corresponds approximately to the value which is achievable corresponding to the effective nozzle Mach number without causing the gas flow to separate from the wall (Prandtl-Meyer-angle). The curvature is further selected so that the nozzle surfaces at the nozzle end become almost parallel whereby the gas flow leaves each of the nozzles as a jet of constant cross-sectional area.

The nozzles can for example also be so constructed that there is provided a transition from a circular nozzle throat to a rectangular or hexagonal nozzle outlet.

It is also conceivable to construct the nozzles as a funnel with a circular nozzle throat and nozzle outlet, although in such case a circular arrangement around a central nozzle should be more advantageous than a straight line arrangement, even though in such case wedgelike gaps will occur from nozzle to nozzle.

The embodiments of the invention in which an exclusive privilege or property is claimed are defined as follows:

1. In a gas-dynamic laser utilizing a supersonic flowing gaseous lasing medium, the improvement comprising:
 a plurality of contoured nozzles having interior surfaces expanding in three directions and having a polygon-shaped cross section arranged side-by-side and the axes thereof extend in a parallel relation, each of said nozzles having a polygon-shaped nozzle throat and a polygon-shaped nozzle outlet wherein each of the individual sides of each of said polygon-shaped nozzle outlets are straight, the area of said nozzle throat being smaller than the area of said nozzle outlet, the mutually adjacent straight sides at said nozzle outlets contacting each other over the full exterior peripheral dimension thereof and are parallel whereby said plurality of nozzles are free of blank spaces therebetween to facilitate a streamlined flow of said gaseous lasing medium from said nozzle outlets.

2. The improvement according to claim 1, wherein said nozzle throat and said nozzle outlet are both rectangular.

3. The improvement according to claim 1, wherein said nozzle throat and said nozzle outlet are both hexagonal.

4. The improvement according to claim 1, wherein the interior nozzle surface of each nozzle is curved and extends, at the nozzle outlet in almost parallel relationship to said axis thereof so that lasing medium leaves each respective nozzle as a jet of constant cross-sectional area.

5. The improvement according to claim 1, wherein the interior nozzle surface of each nozzle is polished smooth.

6. The improvement according to claim 1, wherein each of said nozzles is made of a heat-conducting copper material.

7. The improvement according to claim 1, wherein the expansion ratio of each of the nozzles for a $CO_2$-laser is in the range of 10 to 20 and in a CO-laser in the range of 100 to 1000.

8. In a gas-dynamic laser utilizing supersonic flowing gaseous lasing medium, the improvement comprising:
 a plurality of contoured nozzles having interior surfaces expanding in three directions and having a polygon-shaped cross section arranged side-by-side and the axes thereof extend in a parallel relation, each of said nozzles having a circular shaped nozzle throat and a polygon-shaped nozzle outlet wherein each of the individual sides of each of said polygon-shaped nozzle outlets are straight, the area of said nozzle throat being smaller than the area of said nozzle outlet, the mutually adjacent straight sides at said nozzle outlets contacting each other over the full exterior peripheral dimension thereof and are parallel whereby said plurality of nozzles are free of blank spaces therebetween to facilitate a streamlined flow of said gaseous lasing medium from said nozzle outlets.

* * * * *